United States Patent [19]

Oddou

[11] Patent Number: 5,459,513
[45] Date of Patent: Oct. 17, 1995

[54] DEVICE FOR ENCODING ONE CONTOUR SIDE OF SEGMENTED IMAGES, AND DECODER THEREFOR

[75] Inventor: Christophe Oddou, Ablon Sur Seine, France

[73] Assignee: U.S. Philips Corporation, New York, N.Y.

[21] Appl. No.: 122,870

[22] Filed: Sep. 16, 1993

[30] Foreign Application Priority Data

Sep. 23, 1992 [FR] France .................... 92 11331

[51] Int. Cl.$^6$ ............................................ H04N 7/12
[52] U.S. Cl. .................... 348/397; 348/399; 382/199
[58] Field of Search .................... 382/22, 9; 348/397, 348/399

[56] References Cited

U.S. PATENT DOCUMENTS

| 4,980,764 | 12/1990 | Henot | 348/397 |
| 5,233,671 | 8/1993 | Murayama | 382/22 X |
| 5,257,116 | 10/1993 | Suzuki | 382/22 X |

FOREIGN PATENT DOCUMENTS 9210757  9/1992  France .

OTHER PUBLICATIONS

"Recent Results in High-Compression Imaging Coding" by M. Kunt, M. Benard and R. Leonardi, Published in IEEE Transactions on Circuits and Systems, vol. CAS-34, No. 11, Nov. 1987, pp. 1306-1336.

*Primary Examiner*—James J. Groody
*Assistant Examiner*—Cheryl Cohen
*Attorney, Agent, or Firm*—David R. Treacy

[57] ABSTRACT

A device for coding still images, wherein the still images are segmented into homogeneous regions whereto a specific label is attached. The contents and the contours of the regions are coded by circuitry including a sub-assembly (30) for coding contour information which itself includes a contour detector. On the contours of each region the real direction of orientation on the type of contour edge retained for the transmission is detected, and tested by comparing, for each pair of successive image points of each contour segment, the real direction of orientation thus detected and the instantaneous direction of orientation between these two points. The device further includes circuitry for coding segments traversed in the detected real direction of orientation, and for re-initializing the entire procedure for each of the regions.

3 Claims, 3 Drawing Sheets

```
1 1 1 1 1 1 1 1 1 1 1 1 1 1 1 1 1
1 1 1 1 1 1 1 1 1 1 1 1 1 1 1 1 1
3 3 3 3 2 2 2 2 2 2 2 2 2 2 1 1 1
3 3 3 3 2 2 2 2 2 2 2 2 2 2 1 1 1
3 3 3 3 2 2 2 2 2 2 2 2 2 2 1 1 1
3 3 3 3 2 2 2 2 2 2 2 2 2 2 1 1 1
3 3 3 3 3 3 3 3 3 3 1 1 1 1 1 1 1
3 3 3 3 3 3 3 3 3 3 1 1 1 1 1 1 1
```
FIG. 2
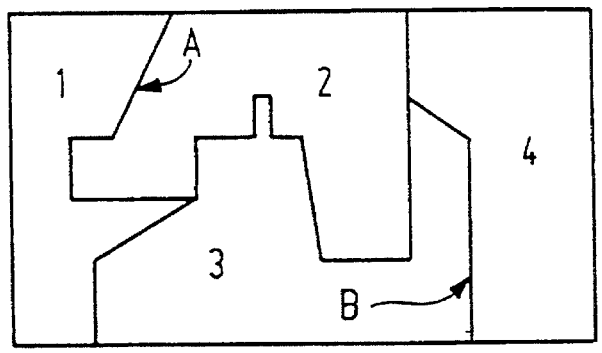
FIG. 3
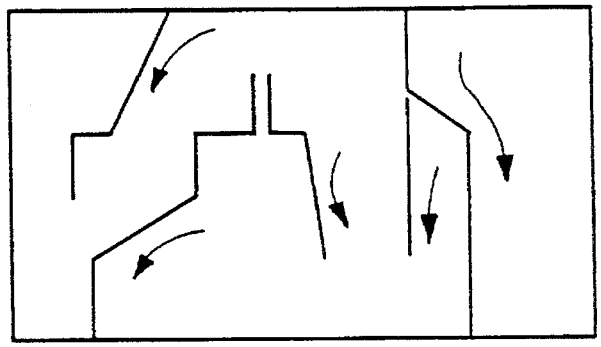
FIG. 4

DEVICE FOR ENCODING ONE CONTOUR SIDE OF SEGMENTED IMAGES, AND DECODER THEREFOR

CROSS-REFERENCE TO RELATED APPLICATION

This application is related to patent application Ser. No. 08/111,682, filed Aug. 25, 1993 by the inventor herein and another.

FIELD OF THE INVENTION

The invention relates to a device for coding still images, comprising means for segmenting said images into homogeneous regions, and means for coding the contents and the contours of said regions, as well as to an associated decoding device. The invention can be used notably in the field of transmission and/or storage of still images, for example to realise extremely simple coders/decoders in applications involving a "Minitel" or similar device.

BACKGROUND OF THE INVENTION

Numerous documents, for example the article "Recent results in high-compression imaging coding" by M. Kunt, M. Bénard and R. Leonardi, published in IEEE Transactions on Circuits and Systems, Vol. CAS-34, No. 11, November 1987, pp. 1306–1336, describe the coding technique based on pre-segmentation of each image into a set of regions while preserving the contours corresponding to the objects present within the image. Generally speaking, said segmentation consists of determining, in conformity with given criteria, regions within the image which are comparatively homogeneous, that is to say regions with a small or zero variation of the brightness, and of coding on the one hand the contents of these regions and on the other hand their contour.

Methods are now available which seem to be satisfactory for the coding, with data compression, of the texture or the contents of these regions. However, this does not hold for the contours which, since they are more numerous as the regions are more numerous, remain very expensive to code, because they represent a major part of the signals to be coded. Moreover, the signals thus coded contain a substantial redundancy because the contour of a region partly defines the contour of neighbouring regions.

SUMMARY OF THE INVENTION

Therefore, it is a first object of the invention to propose a coding device which offers a substantial reduction of the coding costs via a very substantial reduction of the number of contour data to be transmitted.

To this end, a coding device as defined in the preamble in accordance with the invention is characterized in that said contour coding means comprise a subassembly for coding contour information which itself comprises:

(a) means for detecting contours in the image to be coded;
(b) means for detecting, on the contour of each region successively considered, the real direction of orientation on the type of contour edge retained for the transmission after coding, and for testing by comparing, for each pair of successive image points of each contour segment of said region, the real direction of orientation with the instantaneous direction of orientation between these two points;
(c) means for selecting and coding exclusively the contour segments traversed in said detected real direction of orientation;
(d) means for controlling the effective execution of the method utilizing the means specified sub (a), Co), (c) for each of the regions resulting from the segmentation.

The proposed structure enables the contour data to be transmitted without information redundancy. Actually, by transmitting only the edges facing the same side of the contour of each region which are facing the same side, for example exclusively the left-hand edges, it is avoided that the same contour segment is transmitted twice during the treatment of two adjacent regions.

It is another object of the invention to propose a decoding device which is suitable for decoding the coded signals transmitted by a coding device of the kind set forth.

To this end, the invention relates to a device for decoding signals which correspond to still images previously coded by means of a coding device where the coding device comprises means for segmenting said images into homogeneous regions, and means for coding the contents and the contours of said regions. The decoding device itself comprises means for decoding said signals and means for reconstructing decoded images corresponding to said original still images, and is characterized in that it comprises a sub-assembly for decoding coded information relating to the contours of said regions, which sub-assembly itself comprises:

(a) means for decoding the first point of each contour segment transmitted and the other point or points of said segment;
(b) means for writing said first and other points of each contour segment transmitted into an image memory, for identifying each segment by the label of the corresponding region, and for scanning and filling said image memory with the current label corresponding to each segment encountered;
(c) sequencing means for controlling the effective execution of the coding of those contours utilizing the means specified in sub-paragraphs (a), (b).

BRIEF DESCRIPTION OF THE DRAWINGS

The particularities and advantages of the invention will become apparent from the following description and the accompanying drawings, given by way of non-limitative examples, in which

FIG. 2 shows an example of a label image as stored in the coding device after segmentation of an original image, in this case comprising 20×8 pixels;

FIG. 3 shows a simplified example of an image comprising four regions, together with given edges which constitute a left-hand edge for one region but a right-hand edge for an adjoining region, and FIG. 4 shows the corresponding image when that image comprises for each region only the contour segments, which are of the type of contour edge (in this case the left-hand edges) chosen for the transmission.

DESCRIPTION OF PREFERRED EMBODIMENTS

Figure 1:
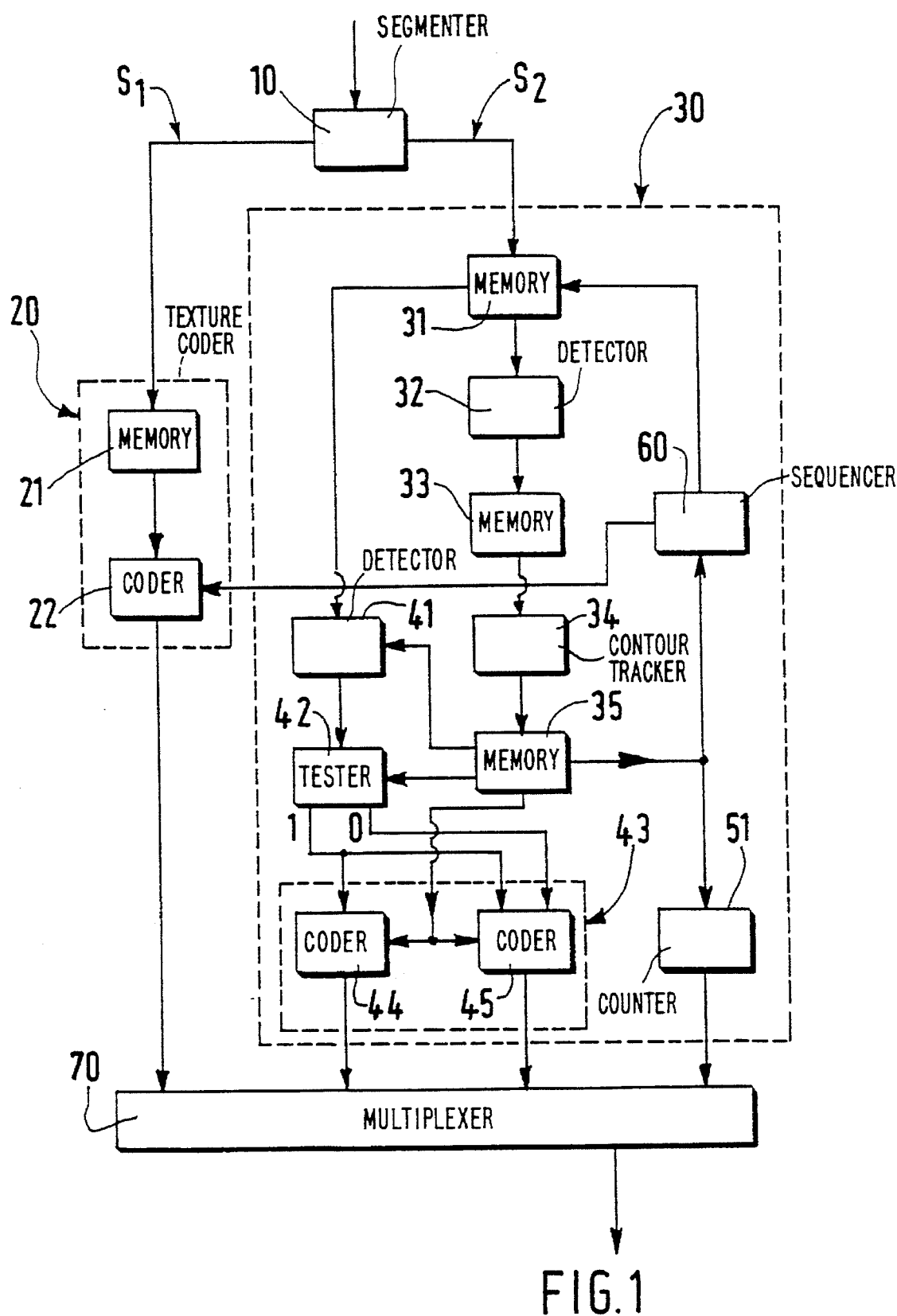
FIGS. 1 and 5 show embodiments in accordance with the invention of a coding device and a decoding device, respectively.

The coding device shown in FIG. 1 comprises first of all a segmentation sub-assembly 10 which subdivides each image of the sequence of images into homogeneous regions. The segmentation, in this case being realised according to the so-called "split-and-merge" method as described, for example in the article "Recent results in high-compression imaging coding" by M. Kunt, M. Bénard and R. Leonardi, published in IEEE Transactions on Circuits and Systems, Vol. CAS-34, No. 11, November 1987, pp. 1306–1336 cited above, makes available, on two outputs $S_1$ and $S_2$ of the sub-assembly 10, on the one hand data representing the contents of the regions and on the other hand contour data. In this case the contour data are in the form of labels defining the association of image points (or pixels) with a specific region that is, for a given image all pixels within a given region are assigned the same unique label. The first output $S_1$, supplying the data relating to the contents of the regions, is connected to a sub-assembly 20 for ceding texture information of each region, whereas the second output $S_2$, supplying the contour data, is connected to a sub-assembly 30 for coding this data.

The sub-assembly 20 comprises a series connection of a memory 21 for storing texture data and a circuit 22 for coding this data. The actual execution of the coding, or its validation, is controlled by the sub-assembly 30 as will be described hereinafter. In the case where the spatial brightness variations constituting said texture data are expressed by way of low-order polynomial functions, for example when with each region there is associated a polynomial of the type Z=a+bx+cy which defines as well as possible the variations of the grey level in this region and in which a, b, c constitute a set of specific polynomial coefficients assigned to this region, coding is performed, for example by choosing three non-collinear points of amplitude $Z_1$, $Z_2$, $Z_3$ in the plane representative of this expression Z and by encoding these values $Z_1$, $Z_2$, $Z_3$ on 8 bits.

The sub-assembly 30 itself comprises first of all a memory 31 for storing labels for the entire image considered. FIG. 2 shows an example of a label image as stored in the memory 31. This is a particularly simple example, because it comprises only three regions; nevertheless it offers a suitable explanation. In this case the image corresponds to an image comprising 20×8 pixels. Each of the regions is denoted by its label, in this case 1, 2 or 3, and all pixels are assigned to one of these labels without exception, the real boundary between the regions extending between the labels of different value. This memory 31 is followed by a series connection of circuits 32 to 35 which successively process each of the regions resulting from the segmentation. A re-initialization enables the processing to proceed from one region to the next until ultimately all regions of the segmented image have been dealt with. These circuits for processing each region consist successively of a circuit 32 for detecting the contour of the region by detection of changes of label (during an arbitrary and, for example row-wise or column-wise scan), an image memory 33 for the storage of the contour of the detected region (for example, by setting the pixels situated on this contour and those situated mainly elsewhere, to the sides of the contour, to distinct brightness levels), a circuit 34 for tracking this contour in order to reconstruct it, and a memory 35 which, during said tracking, stores the sequence of coordinates of the pixels relating to this contour.

The sub-assembly 30 also comprises a detector 41 for detecting the direction of orientation on each region contour for a given type of contour edge (for example, a left-hand edge; however, this could also be a right-hand edge). The effect of this circuit is as follows. If the entire contour of each region is transmitted during the image transmission which should succeed the coding, it will be found that each contour is transmitted twice: once as the contour of a given region and once as the contour of a region adjoining the given region. This situation is illustrated in FIG. 3 which shows a simplified example of an image which comprises four regions 1, 2, 3, 4 and in which the segment A is a right-hand edge of the region 1 but a left-hand edge of the region 2, the segment B being a right-hand edge of the region 3 but a left-hand edge of the region 4 etc. The left-hand and right-hand edges are in this case defined for a conventionally scanned image (initial image or label image stored after segmentation), i.e. an image line-wise scanned from left to right and from the top downwards, but scanning other than this TV-type scanning could also be adopted within the scope of the invention, for example, column-wise scanning from the top downwards and from right to left.

In order to avoid such a transmission redundancy (double transmission of contours), it is decided to transmit each contour only once; to this end, for the contour of a given region it suffices to transmit only the contour segments of a given type, for example the segments constituting the left-hand edges. Actually, the segments which constitute the right-hand edges and which, therefore, are not to be transmitted as information relating to the region concerned, however, constitute the left-hand edges for a region adjoining the region concerned (actually, a region situated to the right thereof and will, therefore, be transmitted as information relating to said adjoining region.

When the type of contour segment to be transmitted has thus been chosen (here and hereinafter always the segments constituting the left-hand edges are chosen), regardless of the region considered in the image, it is necessary to determine the real direction of orientation (from the top down or from the bottom upwards) on the edges retained a priori for the transmission (in this case the left-hand edges), taking into account the effective orientation direction on the contour of the region concerned (this effective orientation direction, being clockwise or counter-clockwise, is the direction corresponding to the sequence in which the pairs of coordinates of the pixels successively relating this contour are encountered in the memory 35). The real direction of orientation is determined by the detector 41 which for this purpose receives the output signal of the label image memory 31 and the output signal of the memory 35 for storing the sequence of the coordinates of the pixels of the contour concerned. The detector 41 determines the real orientation direction by verifying whether for two successive points of the contour the labels of the region concerned are situated to the fight or to the left: if they are situated to the right when the effective orientation direction on the contour is clockwise, the real orientation direction on the left-hand edges is from the bottom upwards; however, if they are situated to the left when the effective orientation direction on the contour is counter-clockwise, the real orientation direction on the left-hand edges is from the top downwards. In correspondence with FIG. 3, FIG. 4 shows an image in which only the left-hand edges of the four regions of FIG. 3 subsist and in which the arrows indicate that in this example the order of succession of the pixels (as stored by way of their coordinates in the memory 35) corresponds to a counter-clockwise effective orientation direction (being the second one of the above hypotheses), and hence that each contour segment constituting a left-hand edge is actually described from the top downwards for such an effective orientation direction; this can be referred to as its instantaneous orientation direction.

Once this instantaneous orientation direction has been determined, a test circuit 42, connected to the output of the detector 41 and also receiving the output signal of the memory 35, starts to operate so as to verify, for each pair of pixels successively encountered while tracking the contour in the direction defined by the sequence of storage in the memory 35, whether or not the instantaneous orientation direction is the real orientation direction determined by the detector 41.

If the response is positive (output "1" of the test circuit 42: the instantaneous orientation direction is indeed the real orientation direction determined by the detector 41), the circuit 42 controls the operation of means for selection and coding which in this case consist of a coding stage 43. The stage 43 itself distinguishes two different situations:

the first pixel of the pair of pixels concerned is the first point of a contour segment for which the response of the test circuit becomes positive again: this first pixel is then the first point of a segment which will be coded continuously until said response becomes negative again and, in that case, the coding of exclusively this first pixel is provided by a coding circuit 44 which receives the output signal "1" of the circuit 42;

the first pixel of the pair concerned is not the first point of said segment, but simply forms part of this continuously coded segment; in this case the coding of this point (and all subsequent points of the segment) is provided by a coding circuit 45 which also receives the output signal "1" of the circuit 42.

In the described example, the circuit 44 for coding the first point of a segment supplies, after transmission of a header of the coded segment, to be read upon decoding, the absolute coordinates of this point, whereas the circuit 45 for coding subsequent points supplies relative information defined with respect to said absolute coordinates; however, this solution is not the only solution possible and it does not represent a restriction of the present invention.

However, if the response of the test circuit 42 is or becomes negative (output "0" of this circuit: the instantaneous orientation direction is not the real orientation direction determined by the detector 41), the circuit 42 controls the deactivation of the coding circuit 45 (which thus receives the output "0" from the circuit 42) in order to inhibit any coding until the response of the test circuit has become positive again.

The sub-assembly 30 also comprises a sequencing circuit 60 which is controlled by the memory 35 (when the last point of the contour of a region has been considered). The output of the circuit 60 provides effective validation (see the corresponding connection in FIG. 1) of the coding performed by the coding circuit 22 of the sub-assembly 20 for coding information in respect of texture, in synchronism with that performed by the coding stage 43, and subsequently controls the re-initialization of the entire above procedure for a new region (and so on until all regions of the image have been dealt with). Finally, the sub-assembly 30 comprises a region counter 51 which assigns a distinct number to each new region successively treated so as to enable the decoder to reassociate with each contour of the image region its respective data from the stream of binary signals to be decoded. A multiplexer 70 receives the output signals of the circuits 22, 44, 45 and 51 and outputs the sequence of digital signals to the transmission channel.

The operation of the coding device in accordance with the invention can be summarized as follows. Once the contour chain (i.e. the sequence of the coordinates of the pixels of each contour) has been determined for a region (each region thus successively becoming the current region), on this contour chain there is marked at least one pair of pixels situated on the type of contour edge retained for the transmission, for example on a left-hand edge in the present case. For this pixel, the orientation direction of the contour is noted, from bottom to top or from top to bottom in the example concerning the left-hand edge: all similar edges, being the left-hand edges in the above example, must then necessarily be followed in the same direction. The sequential scanning of the contour chain then commences, one pixel after the other, and coding and transmission take place exclusively for the pixels with which an orientation direction corresponds which is identical to the orientation direction of the type of edge retained for the transmission.

Figure 5:
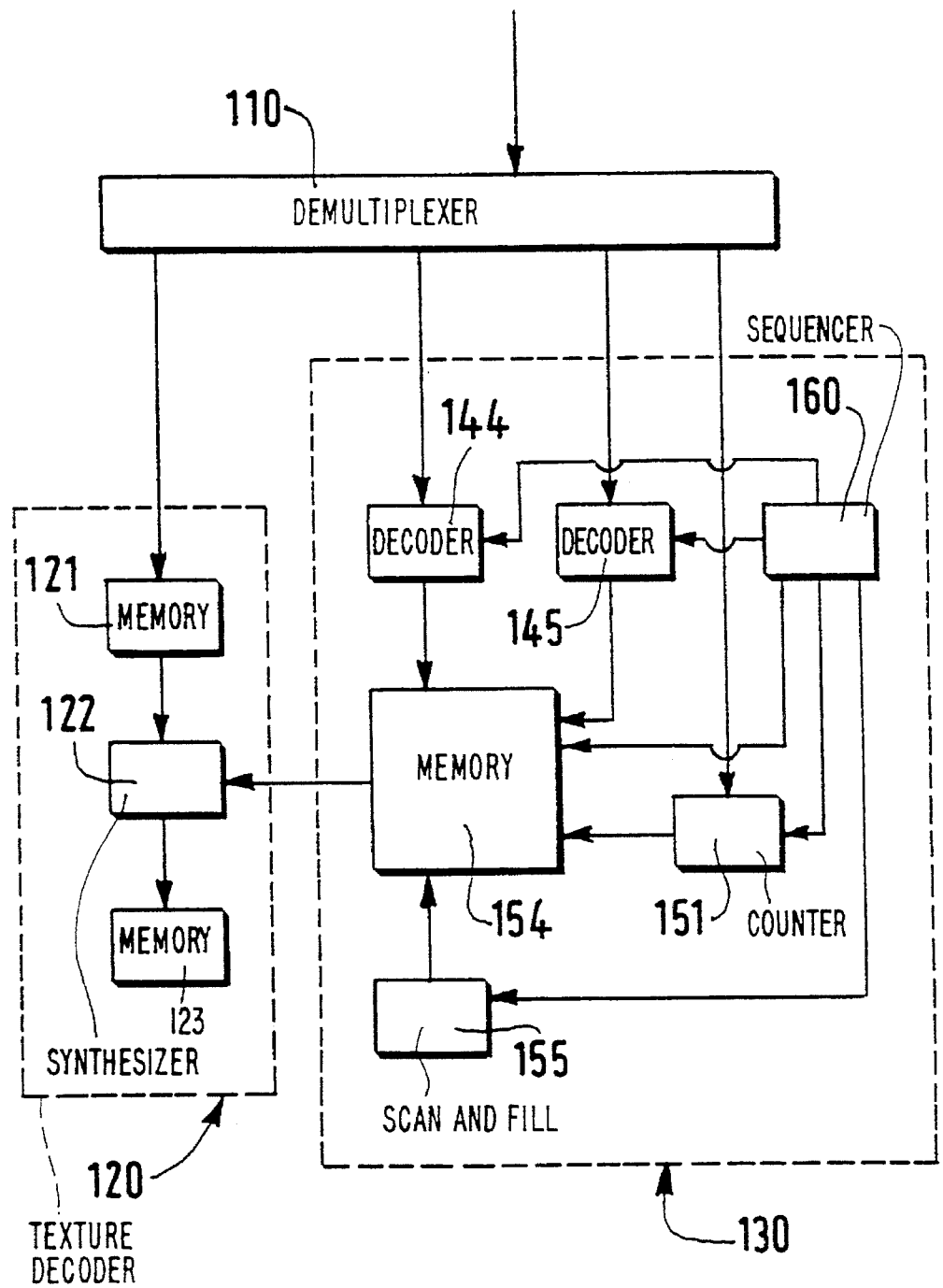

Conversely, when the still images have been coded in conformity with the above description, a decoding device for decoding the coded signals transmitted by the above coding device can be proposed within the scope of the present invention. The embodiment of the decoding device described herein (see in FIG. 5) comprises first of all a demultiplexer 110 which receives, after their transmission, the various signals supplied by the coding device and serves to guide these signals to the appropriate circuits of said decoding device as will be indicated hereinafter.

A sub-assembly 120 for decoding texture information of each region receives from the demultiplexer 110 the signals originating from the sub-assembly 20, that is to say the coded polynomial coefficients in this case. The sub-assembly 120 comprises a series connection of a memory 12 1 for storing this texture information, a circuit 122 for polynomial synthesis, and an image memory 123.

A sub-assembly 130 for decoding contours (which contours constitute an image partition or segmentation as obtained and coded in conformity with the above description) receives the other output signals of the demultiplexer 110. In the subassembly 130 the header of the coded segment and the absolute coordinates of the first point of a contour segment to be transmitted, delivered by the coding circuit 44, are received by a circuit 144 for decoding the first point of each contour segment transmitted, whereas the coded signals corresponding to the coordinates of the subsequent points of said segment, supplied by the coding circuit 45, are received by a circuit 145 for decoding the other points of the contour segment transmitted. Finally, a region counter 151 receives the coded signals supplied by the region counter 51 and corresponding to the numbers of the regions treated. The sub-assembly 130 also comprises an image memory 154, a circuit 155 for scanning and filling this memory, and a sequencing circuit 160 for controlling the effective execution of the decoding operation for each of the regions resulting from the initial segmentation.

The operation of the decoding device is as follows. The number of the current region, given by the region counter 151, is written into the image memory 154 in a position defined by the stream of decoded signals. More precisely, the circuit 144 for decoding the first point of a contour segment enables initialization, or updating, in this memory 154, of the write position in view of the writing of said first contour segment point. The circuit 145 for decoding the other points of the segment, controlled by the circuit 144, then controls the writing of the other points into said memory 154. Once all edges retained for the transmission, for example the left-hand edges in this case, have thus been followed, the image is line-wise scanned (from left to right, and subsequently from the top to the bottom in the case of the example described herein) by writing the current label until no further left-hand edge is encountered, or the new label concerned when a left-hand edge is traversed. The procedure is similar each time when a left-hand edge is traversed during the scanning, until the entire label image corresponding to the original segmented image has been reconstructed.

The output of the image memory 154 is then applied to a second input of the circuit 122 for polynomial synthesis in order to define, for each region, the zone in which this synthesis takes place, thus enabling the reconstruction, by the image memory 123, of a decoded image corresponding to the original still images.

It is to be noted that the present invention is not limited to the embodiments described and shown and that on the basis thereof alternatives can be proposed without departing from the scope of the invention. It is to be noted particularly that the technical solution proposed herein can be applied to any type of contour.

For example, a previous French Patent Application No. 9210757, filed on Sep. 9, 1992, to which co-pending U.S. patent application 08/111,682 corresponds, describes a coding device in which the original pixel chain of the contour is transformed into a polygonal chain of successive contour segments. More precisely, this device examines the segmented image to be coded, detects the various region contours therein by examination of the labels in the course of an image scan, and subsequently selects on the contour of each region the points which are referred to as triplets, i.e. points where contact exists between at least three regions, and possibly also supplementary control points. The device then transforms the contour segment of arbitrary shape, present between two of these successive points, into a line segment which constitutes an approximation thereof. The succession of segments thus formed constitutes a polygonal contour whereto the present invention is applicable in a particularly attractive manner because, since the segments are rectilinear, for reconstruction upon decoding it suffices to code (and transmit) the two extremities.

I claim:

1. A device for coding still images, comprising means for segmenting said images into homogeneous regions, and means for coding contents and contours of said regions, characterized in that said contour coding means comprises a sub-assembly for coding contour information, and said sub-assembly comprises:

(a) means for detecting contours in the image to be coded;

(b) means for detecting, on the contour of each region successively considered, the real direction of orientation on a type of contour edge to be retained for transmission after coding;

(c) means for detecting, for each pair of successive image points of each contour segment of said region, the instantaneous direction of orientation between two successive image points of each pair;

(d) means for comparing the instantaneous direction of orientation for each said pair with said real direction of orientation for said region, in order to test whether or not these real and instantaneous directions are identical;

(e) means for selecting and coding exclusively the contour segments traversed in said real direction of orientation; and (f) means for controlling the effective execution of said coding of said contours, utilizing the means specified in subparagraphs (a), (b), (c), (d) and (e) for each of the regions resulting from the segmentation.

2. A as claimed in claim 1, characterized in that said means for selecting and coding comprises a coding stage which comprises a parallel connection of a circuit for coding the first point of a segment and a circuit for coding at least one other point of the same segment.

3. A device for decoding signals, which correspond to still images previously coded by a coding device comprising means for segmenting said images into homogeneous regions each associated with a respective label, and means for coding contents and contours of said regions, wherein said decoding device comprises means for decoding said signals and means for reconstructing decoded images corresponding to the original still images, characterized in that said means for decoding comprises a sub-assembly for decoding coded information relating to the contours of said regions, and said sub-assembly comprises:

(a) means for decoding the first point of each contour segment transmitted, and other points of said segment, (b) means for writing said first and other points of each transmitted contour segment into an image memory, for identifying each segment by the label of the corresponding region, and for scanning and filling said image memory with the current label corresponding to each said segment; and (c) sequencing means for controlling the effective execution of said decoding said signals utilizing the means specified in subparagraphs (a) and (b).

* * * * *